C. C. BOLEN & G. WELLS.
OPERATING MECHANISM FOR HAND BRAKES.
APPLICATION FILED FEB. 7, 1916.
1,188,239.   Patented June 20, 1916.
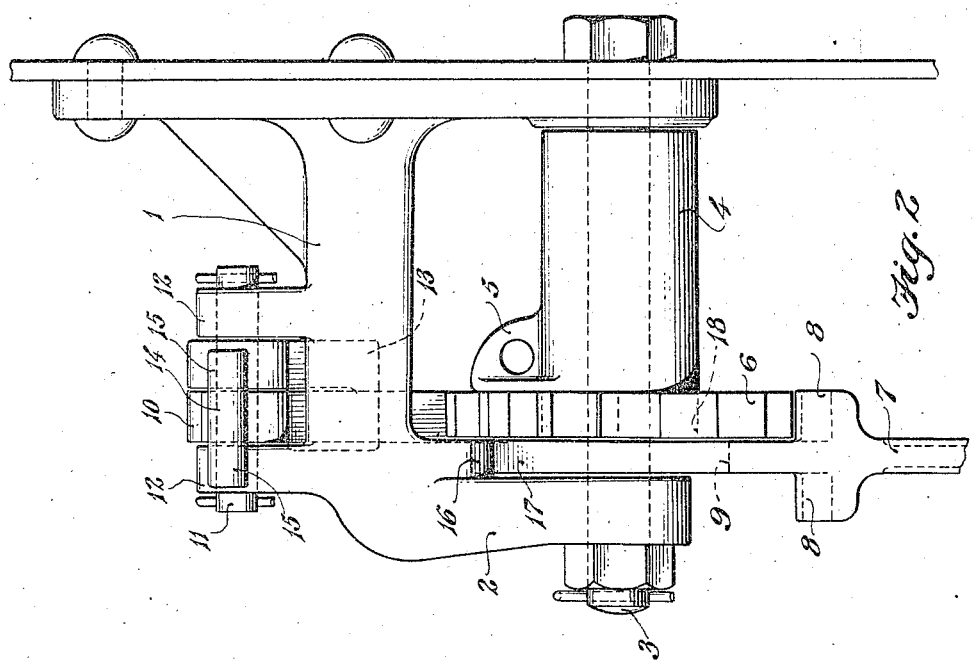
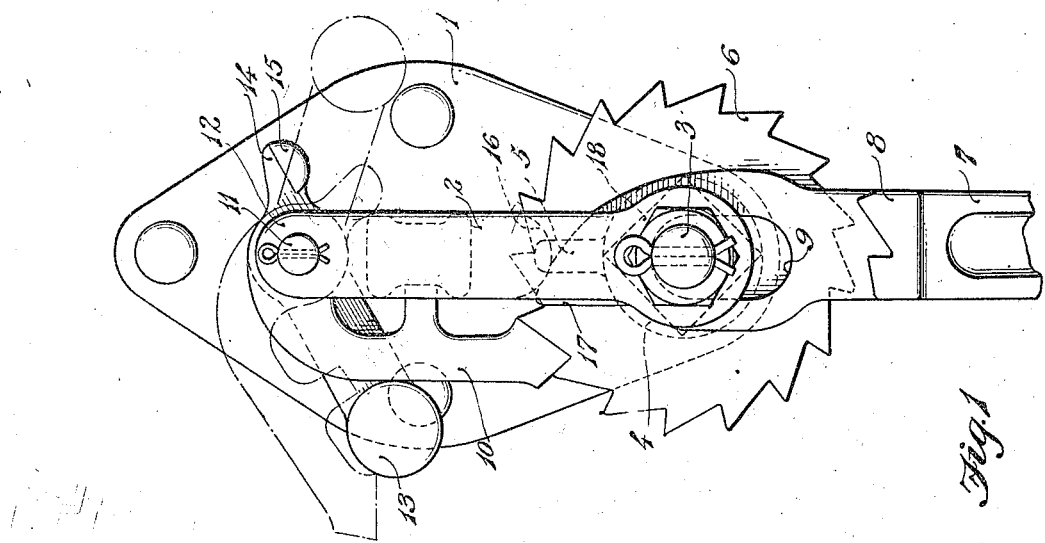
INVENTORS.
Charley C. Bolen
BY George Wells
Edward Reed
ATTORNEY.

UNITED STATES PATENT OFFICE.

CHARLEY C. BOLEN AND GEORGE WELLS, OF MARION, OHIO.

OPERATING MECHANISM FOR HAND-BRAKES.

1,188,239.  Specification of Letters Patent.  Patented June 20, 1916.

Application filed February 7, 1916. Serial No. 76,579.

*To all whom it may concern:*

Be it known that we, CHARLEY C. BOLEN and GEORGE WELLS, citizens of the United States, residing at Marion, in the county of Marion and State of Ohio, have invented certain new and useful Improvements in Operating Mechanism for Hand-Brakes, of which the following is a specification, reference being had therein to the accompanying drawing.

This invention relates to operating mechanism for hand brakes.

It has been proposed heretofore to provide pawl and ratchet operated winding mechanism to operate the brakes on railway cars, but difficulty has been experienced in releasing the winding mechanism after the brakes have been set.

The object of the present invention is to provide a very simple and highly efficient hand operated pawl and ratchet winding mechanism for operating the brake and to so construct and arrange this mechanism that the actuating pawl will be automatically disengaged from the ratchet wheel when the operating lever is released.

It is also an object of the invention to so construct and arrange the mechanism that there will be no danger of the operating lever striking the operator after he has released the same.

It is a further object of the invention to so construct the winding mechanism that the pawl and ratchet devices may be reversed so as to turn the winding drum in either direction, thus enabling the device to be mounted for operation from either the right or left hand side.

In the accompanying drawings Figure 1 is a front elevation of a mechanism embodying our invention, with the operating lever partly broken away; and Fig. 2 is a side elevation of the mechanism shown in Fig. 1.

In these drawings we have illustrated one embodiment of our invention and have shown the same as comprising a support for the winding mechanism, which support is preferably in the form of a bracket 1 having a base by means of which it may be secured to the frame or wall of a car and also having a depending portion 2 in which is supported one end of a shaft, or bolt, 3, the other end of which extends through and is supported by the base of the bracket. Mounted upon the shaft 3 is a winding-drum 4 having an ear 5 to which may be connected one end of the flexible brake operating member, which is usually in the form of a chain. Rigidly secured to the drum 5 is a ratchet wheel 6. Carried by the supporting bracket 1, and preferably mounted on the shaft 3, is an operating lever 7 which carries a pawl adapted to engage the ratchet wheel 6 and operate the winding drum 4. Preferably, the pawl is rigidly secured to or formed integral with the lever 7, and it is here shown as a laterally extending projection 8 having two teeth to engage the corresponding teeth of the ratchet wheel and impart movement thereto. Obviously, the pawl may have any number of teeth but by providing the same with two teeth we overcome any tendency to twist or turn, which is sometimes present when a single tooth is used. To permit this rigidly mounted pawl to ride over, and to be moved into and out of operative engagement with, the teeth of the ratchet wheel, the lever 7 is mounted for longitudinal movement, this being accomplished in the present instance by providing the same with a longitudinal slot 9 through which the shaft 3 extends. The winding mechanism is held against rearward movement by means of a detent pawl 10, which is here shown as mounted on a shaft 11, which is mounted in bearings 12 carried by the bracket 1 and arranged above the ratchet wheel. The pawl is held yieldingly in engagement with the teeth of the ratchet wheel by means of a weighted arm 13 which is also mounted on the shaft 11 and so arranged that the weight, which projects laterally from the arm, will rest upon the pawl as shown in full lines in Fig. 1. This same weight is utilized to move the detent pawl out of engagement with the ratchet wheel and to hold the same in its inoperative position. To this end the pawl 10 has a tail portion 14 provided with a laterally extending lip 15 and arranged in the path of the weighted arm when the latter is moved to that side of its axis opposite the pawl 10. Thus when it is desired to release the ratchet wheel from the pawl, the ratchet wheel is operated by the lever 7 to relieve the pressure on the pawl 10 and the weight 13 is thrown into the position shown in the dotted lines in Fig. 1, thereby moving the pawl into its inoperative position.

When the pawl 10 has been moved into its inoperative position, the pull on the winding mechanism is exerted wholly upon the operating lever, which is in the hand of the operator. In order that this lever and its actuating pawl may be automatically disconnected from the ratchet wheel, we have so arranged the lever that it and its pawl lie normally below the ratchet wheel, so that the pawl will engage the lower half of the ratchet wheel and will be operated by an upward pull on the lever. Consequently, when the lever is released it will move about its axis by gravity to a substantially vertical position and this downward movement will also tend to impart lengthwise movement to the lever and thus disengage the pawl from the teeth of the ratchet wheel. When the brake has been set and the winding mechanism is under tension, the tendency of the lever to move lengthwise when released will be materially increased by centrifugal force and the combined forces of gravity and centrifugal action will serve under all ordinary conditions to disengage the pawl 8 from the ratchet wheel. To limit the swing of the lever after it has been released by the operator we have provided the bracket with a stop 16 and have formed on the upper end of the lever 7 an extension, or nose, 17, which will engage the stop 16 and check the movement of the lever. In the present instance we have shown the stop and nose so arranged that the movement of the lever is checked when the latter is in a substantially vertical position, but obviously the relative positions of the stop and the nose on the lever can be altered to enable the lever to have any desired amount of movement. The contacting faces of the stop and the nose of the lever may be inclined, or cam shaped, so that when the nose is moved forcibly into engagement with the stop a longitudinal thrust will be exerted upon the lever. This cam action will serve to overcome any sticking of the operating lever or any failure of the pawl to move out of engagement with the ratchet wheel, thus making the release of the winding mechanism doubly certain.

Brake operating mechanisms of this character are mounted in different positions on different cars and it is sometimes desirable that they should be operated from the right hand side of the mechanism, and sometimes desirable that they should be operated from the left hand side of the mechanism. We have, therefore, so constructed the mechanism that it can be readily reversed or changed from a right hand to a left hand device. To accomplish this the ratchet wheel 6 is formed separate from the drum 4 and removably secured thereto. As here shown, the drum has an angular projection 18 on which the ratchet wheel is mounted and from which it can be readily removed. The construction is such that the ratchet wheel may be mounted on this squared projection with either side thereof adjacent to the drum and thus the teeth of the ratchet wheel can be caused to face in either direction. The lever 7 can, of course, be reversed and to enable it to operate the ratchet wheel when in either position, we have provided it with two pawls 8 which are arranged on opposite sides thereof, as clearly shown in Fig. 2. Likewise the detent pawl 10 may be removed and reversed and when in its reversed position will operate in the same manner as before. The shafts, 2 and 11, being readily removable from their bearings it is a simple matter to reverse the positions of the parts and transform the device from a right hand to a left hand mechanism.

The operation of the device will be readily understood from the foregoing description and it will be apparent that we have provided an operating mechanism for hand brakes which is very simple in its construction and operation, and in which the operating lever will be automatically disengaged from the ratchet wheel whenever the lever is released, and further, that the device can be readily reversed to enable the winding mechanism to be operated from either side thereof. Further, it will be understood that we do not wish to be limited to the details of construction shown and described as obvious modifications will occur to a person skilled in the art.

Having now fully described our invention, what we claim as new and desire to secure by Letters Patent, is:—

1. In a device of the character described, a winding-drum, a ratchet wheel connected therewith, a lever mounted for movement about the axis of said ratchet wheel and having a pawl mounted thereon, said lever being capable of longitudinal movement to move said pawl into and out of engagement with said ratchet wheel and being arranged to support said pawl normally beneath said ratchet wheel to cause said ratchet wheel to be actuated by an upward movement of said lever and to cause said lever, when released, to move downward with both a swinging movement and a longitudinal movement and to automatically disengage said pawl from said ratchet wheel.

2. In a device of the character described, a winding drum, a ratchet wheel connected therewith, means for supporting said winding drum and said ratchet wheel, a lever mounted on said supporting means for movement about the axis of said ratchet wheel, and having a pawl mounted thereon, said lever being mounted for longitudinal movement to move said pawl into and out of engagement with said ratchet wheel and being so mounted with relation to said ratchet wheel that when said ratchet wheel and said lever are released, with the winding mechanism under tension, centrifugal force and the force of gravity will move said pawl out of engagement with said ratchet wheel.

3. In a device of the character described, a winding-drum, a ratchet wheel connected therewith, a lever mounted for movement about the axis of said ratchet wheel and having a pawl mounted thereon, said lever being mounted for longitudinal movement to move said pawl into and out of engagement with said ratchet wheel and being so mounted with relation to said ratchet wheel that when said ratchet wheel and said lever are released, with the winding mechanism under tension, centrifugal force and the force of gravity will move said pawl out of engagement with said ratchet wheel, and a stop to limit the movement of said lever.

4. In a device of the character described, a winding-drum, a ratchet wheel connected therewith, a lever mounted for movement about the axis of said ratchet wheel and having a pawl mounted thereon, said lever being mounted for longitudinal movement to move said pawl into and out of engagement with said ratchet wheel and being so mounted with relation to said ratchet wheel that when said ratchet wheel and said lever are released, with the winding mechanism under tension, centrifugal force and the force of gravity will move said pawl out of engagement with said ratchet wheel, said lever having a part projecting beyond its axis, and a stop arranged in the path of said projecting part, the contacting surfaces of said stop and said projecting part of said lever being shaped to cause the engagement thereof to impart longitudinal movement to said lever, said projecting part being of such a length that it cannot pass said stop.

5. In a device of the character described, a winding-drum, a ratchet wheel connected therewith, a lever mounted for movement about the axis of said ratchet wheel and having a pawl mounted thereon, said lever being mounted for longitudinal movement to move said pawl into and out of engagement with said ratchet wheel and being so mounted with relation to said ratchet wheel that when said ratchet wheel and said lever are released, with the winding mechanism under tension, centrifugal force and the force of gravity will move said pawl out of engagement with said ratchet wheel, said lever having a part projecting beyond the axis thereof, and a cam arranged in the path of said part to impart longitudinal movement to said lever.

6. In a device of the character described, a winding-drum, a ratchet wheel connected therewith, a lever mounted for movement about the axis of said ratchet wheel and having a pawl mounted thereon, said lever being capable of longitudinal movement to move said pawl into and out of engagement with said ratchet wheel and having a part extending beyond the axis thereof, and a cam arranged in the path of said projecting part of said lever, to cause longitudinal movement to be imparted to the lever by the engagement of the projecting part thereof with said cam.

7. In a device of the character described, a winding-drum, a ratchet wheel connected therewith, a lever mounted for movement about the axis of said ratchet wheel and having a pawl mounted thereon, said lever being capable of longitudinal movement to move said pawl into and out of engagement with said ratchet wheel, and means to automatically impart longitudinal movement to said lever in a direction to move said pawl out of engagement with said ratchet wheel.

8. In a device of the character described, a winding-drum, a ratchet wheel, means for rigidly connecting said ratchet wheel to said drum with either side thereof adjacent to said drum, a lever, and means for pivotally supporting said lever with either side adjacent to said ratchet wheel, said lever having pawls mounted on the respective sides thereof.

9. In a device of the character described, a winding-drum, a ratchet wheel, means for rigidly connecting said ratchet wheel to said drum with either side thereof adjacent to said drum, a lever, and means for pivotally supporting said lever with either side adjacent to said ratchet wheel, said lever having pawls mounted on the respective sides thereof, said lever being capable of longitudinal movement to move that pawl which is adjacent to said ratchet wheel into and out of engagement therewith.

10. In a device of the character described, a winding-drum having an angular projection at one end thereof, a ratchet wheel having an opening adapted to receive said projection when either side of said ratchet wheel is adjacent to said drum, a lever having pawls rigidly secured to the opposite sides thereof, and means for pivotally supporting said lever on the axis of said ratchet wheel with either side adjacent to the ratchet wheel, said lever being capable of longitudinal movement to enable the pawl on that side thereof adjacent to said ratchet wheel to be moved into and out of engagement with said ratchet wheel.

11. In a device of the character described, a winding-drum having an angular projection at one end thereof, a ratchet wheel having an opening adapted to receive said projection when either side of said ratchet wheel is adjacent to said drum, a lever having pawls rigidly secured to the opposite sides thereof, and means for pivotally supporting said lever on the axis of said ratchet wheel with either side adjacent to the ratchet wheel, said lever being capable of longitudinal movement to enable the pawl on that side thereof adjacent to said ratchet wheel to be moved into and out of engagement with said ratchet wheel, a detent mounted above said ratchet wheel, and means for supporting said detent.

12. In a device of the character described, a winding-drum having an angular projection at one end thereof, a ratchet wheel having an opening adapted to receive said projection when either side of said ratchet wheel is adjacent to said drum, a lever having pawls rigidly secured to the opposite sides thereof, means for pivotally supporting said lever on the axis of said ratchet wheel with either side adjacent to said ratchet wheel, said lever being capable of longitudinal movement to enable the pawl on that side thereof adjacent to said ratchet wheel to be moved into and out of engagement with said ratchet wheel, a detent mounted above said ratchet wheel and having a nose adapted to engage said ratchet wheel to hold the same against rearward movement, and means for supporting said detent with its nose on either side of the axis thereof.

13. In a device of the character described, a winding-drum having an angular projection at one end thereof, a ratchet wheel having an opening adapted to receive said projection when either side of said ratchet wheel is adjacent to said drum, a lever having pawls rigidly secured to the opposite sides thereof, means for pivotally supporting said lever on the axis of said ratchet wheel with either side adjacent to the ratchet wheel, said lever being capable of longitudinal movement to enable the pawl on that side thereof adjacent to said ratchet wheel to be moved into and out of engagement with said ratchet wheel, a detent mounted above said ratchet wheel and having a nose adapted to engage said ratchet wheel to hold the same against rearward movement, means for supporting said detent with its nose on either side of the axis thereof, and a pivoted weight to engage said detent and hold the same yieldingly in engagement with said ratchet wheel and movable from one side of the axis of said detent to the other side thereof, said detent having a tail provided with lateral projections one of which will extend into the path of said weight when said detent is mounted in one position and the other of which will extend into the path of said weight when said detent is mounted in its other position.

14. In a device of the character described, a supporting bracket, comprising a base and a depending portion spaced away from said base, a shaft extending through said base and said depending portion, a drum mounted on said shaft between the base and the depending portion of said bracket, a ratchet wheel secured to that end of said drum adjacent to said depending portion of said bracket, a lever pivotally mounted on said shaft between said ratchet wheel and the depending portion of said bracket and capable of longitudinal movement on said shaft, said lever having a pawl adapted to be moved into and out of engagement with said ratchet wheel by the longitudinal movement of said lever, a detent pivotally mounted on said bracket and having a nose to engage said ratchet wheel and also having a tail, a weight pivotally mounted on an axis coincident with the axis of said detent and arranged to be moved into a position to engage said detent and hold the same in engagement with said ratchet wheel or into a position to engage the tail of said detent and hold the same in an inoperative position.

15. In a device of the character described, a winding drum, a ratchet wheel connected therewith, a lever pivotally mounted adjacent to said ratchet wheel for movement about the axis thereof and adapted, when released, to move to a position beneath said ratchet wheel and to be supported in said position, said lever having a pawl arranged to operatively engage said ratchet wheel when movement is imparted to said lever, and said lever being capable of limited longitudinal movement to move said pawl into and out of operative engagement with said ratchet wheel, whereby said lever, when released, will move downward with both a swinging movement and a longitudinal movement and will automatically disengage said pawl from said ratchet wheel.

16. In a device of the character described, a supporting structure, a shaft carried by said structure, a drum mounted on said shaft, a ratchet wheel connected with said drum for movement about the axis of said shaft, a lever mounted on said shaft for both pivotal movement and longitudinal movement, and having a pawl arranged to engage said ratchet wheel, whereby said lever when released will move downward with both a swinging movement and a longitudinal movement and will automatically disengage said pawl from said ratchet wheel.

In testimony whereof, we affix our signatures hereto.

CHARLEY C. BOLEN.
GEORGE WELLS.